United States Patent [19]
Matsuda et al.

[11] Patent Number: 5,541,370
[45] Date of Patent: Jul. 30, 1996

[54] PRESSURE-SENSITIVE PAD AND PRODUCTION THEREOF

[75] Inventors: Masayuki Matsuda; Michio Komatsu; Mitsuru Ohkuma, all of Kitakyushu, Japan

[73] Assignee: Catalysts & Chemicals Industries Co., Ltd., Japan

[21] Appl. No.: 256,962

[22] PCT Filed: Dec. 28, 1992

[86] PCT No.: PCT/JP92/01726

§ 371 Date: Jul. 28, 1994

§ 102(e) Date: Jul. 28, 1994

[87] PCT Pub. No.: WO93/15519

PCT Pub. Date: Aug. 5, 1993

[30] Foreign Application Priority Data

Feb. 3, 1992 [JP] Japan ................................. 4-017892

[51] Int. Cl.$^6$ .......................... G08C 21/00; G09G 3/02
[52] U.S. Cl. ................................ 178/18; 178/19; 178/20; 345/141; 345/156; 345/173; 345/179
[58] Field of Search ................................. 178/18, 19, 20; 345/141, 156, 173, 179

[56] References Cited

U.S. PATENT DOCUMENTS

| | | | |
|---|---|---|---|
| 3,911,215 | 10/1975 | Hurst | 178/18 |
| 4,628,408 | 12/1986 | Kimura | 178/18 |
| 4,638,118 | 1/1987 | Wang | 178/20 |
| 4,839,636 | 6/1989 | Zeiss | 345/141 |
| 4,860,372 | 8/1989 | Kuzunuki | 178/18 |
| 4,897,511 | 1/1990 | Itaya | 178/18 |
| 4,947,156 | 8/1990 | Sato | 345/141 |
| 4,963,417 | 10/1990 | Taniguchi | 178/18 |

FOREIGN PATENT DOCUMENTS

| | | | |
|---|---|---|---|
| 62-133618 | 6/1987 | Japan | H01H 13/52 |
| 1176614 | 7/1989 | Japan | H01H 13/02 |
| 250214 | 2/1990 | Japan | G06F 3/03 |

*Primary Examiner*—Stephen Chin
*Assistant Examiner*—Vijay Shankar
*Attorney, Agent, or Firm*—Webb Ziesenheim Bruening Logsdon Orkin & Hanson, P.C.

[57] ABSTRACT

A writing pad having a construction wherein two substrates each having electrodes formed on one of the surfaces are disposed in parallel in such a way that their electrodes face one another with a predetermined gap between them. The gap is defined by insulating dot spacers fixed at regular intervals to at least one of the electrode surfaces. The height G of the dot spacers is smaller than 15 μm, the average center distance L between the adjacent dot spacers is smaller than 100 μm, d>G and 3 d<L<100 d (where d is a diameter of the dot spacers on the electrode surface to which the dot spacers are fixed). According to this writing pad, when characters or graphics are inputted to the input substrate of the writing pad by an input pen, an erroneous input does not occur even when fingers, etc., erroneously come into contact with the input substrate, and the erroneous operation does not occur, either, when the input operation is repeated many times by the input pen.

8 Claims, 2 Drawing Sheets

PRESSURE-SENSITIVE PAD AND PRODUCTION THEREOF

TECHNICAL FIELD

The present invention relates to a writing pad suitable for inputting handwritten images. More particularly, the present invention is concerned with a writing pad which, when characters or graphics are inputted to an input substrate of the writing pad by an input pen, does not cause an erroneous operation even when fingers or other portions of a writer's hand erroneously come into contact with the input substrate, and which is durable against a vast plurality of repeated sliding inputs. Moreover, the present invention relates to a process for producing the same.

BACKGROUND ART

Known in the art is a discriminating contact sensor which comprises a writing pad comprising a juxtaposed pair of upper and lower sheets each having an electrode attached thereto, separated at a given spacing by a plurality of insulating dot spacers, the upper sheet being flexible, and a position detecting circuit that, when the upper flexible sheet is depressed with an input pen, electrically detects the coordinates (x, y) of the depressed position of the upper flexible sheet (see U.S. Pat. No. 3,911,215).

In this sensor, when the input-side sheet having an electrode attached thereto (upper electrode-bearing sheet) of the writing pad is depressed with an input pen, the input-side sheet is flexed by the writing pressure load to thereby cause the upper and lower electrodes of the writing pad to contact with each other so as to create an electrical connection at the depressed site. This permits detection, by means of the position detecting circuit, of the coordinates (x, y) of the position of the sheet depressed by the tip of the input pen.

A handwritten image input device can be obtained by connecting the above position detecting circuit of the sensor to a storage unit having an appropriate memory capacity. In such a handwritten image input device, the coordinates of the positions of a plurality of dots composing the inputted image are stored in predetermined addresses of the storage unit.

Further, when this storage unit is connected to a display unit, the plurality of position coordinates detected by the position detecting circuit and stored in the storage unit are inputted into the display unit, so that the handwritten images inputted in the writing pad are reproduced on a display screen of the display unit.

In the above conventional writing pad, the upper and lower electrodes are contacted by depressing the upper sheet with an input pen so as to flex the sheet, so that in many cases the distance between the dot spacers is, for example, in the range of 0.635 to 1.9 mm as in the above U.S. Patent or greater.

The inventors' study has revealed that, in the conventional writing pad in which the distance between the dot spacers is large and the inputting is performed by flexing the upper sheet, the difference is slight between the load erroneously applied by contacting fingers or other portions of a writer's hand with the input-side sheet when inputting so as to bring the upper and lower electrodes into contact with each other (erroneous input load) and the load required for inputting characters, etc., with an input pen. Thus, erroneous inputtings occur frequently, causing an erroneous operation.

In order to obviate such erroneous inputtings, the above U.S. Patent has proposed the writing pad wherein a distance between the dot spacers and a height thereof satisfy a predetermined relationship. However, it is difficult to completely avoid erroneous inputtings, even if the proposed relationship is satisfied.

Further, the above writing pad has a drawback in that the flex of the input-side sheet repeated by every input operation may cause disconnection of the electrode formed on the input-side sheet or plastic deformation thereof, so that the upper and lower electrodes may be kept contacting with each other, thereby generating input noise.

Still further, in the conventional writing pad, the electrode formed on the flexible sheet is also moved slightly in accordance with the movement of the input pen upon inputting images to the writing pad, so that friction is generated between the electrodes formed on the pair of sheets at the site where both electrodes are brought into contact with each other upon inputting. Therefore, another drawback of the known writing pad is in that, because such friction is repeatedly generated by every input operation with an input pen, there is a great tendency to damage at least one of both electrodes.

The present invention has been made to overcome the above drawbacks of the prior art, and objects of the present invention are to provide a writing pad which, when characters or graphics are inputted to an input substrate of the writing pad by an input pen, does not cause an erroneous input even when fingers or other portions of a writer's hand erroneously come into contact with the input substrate, and does not cause the erroneous operation even when the input operation is repeated many times, and also to provide a process for producing the same.

Further objects of the present invention are to provide a writing pad in which electrodes formed on substrates are highly resistant to damaging by a vast plurality of repeated sliding inputs with an input pen, and to provide a process for producing the same.

SUMMARY OF THE INVENTION

The writing pad of the present invention comprises a pair of substrates each having an electrode formed on one of the surfaces thereof, the pair of substrates being disposed in parallel in such a way that the electrodes face one another with a predetermined gap between the substrates by means of a plurality of insulating dot spacers, wherein a height (G) of the dot spacers is not greater than 15 μm, a diameter (d) of the dot spacers on the electrode surface to which the dot spacers are fixed is greater than G (d>G), and an average center distance (L) between the adjacent dot spacers, namely an average distance (L) between the centers of the adjacent dot spacers, is not greater than 100 μm and 3 d<L<100 d.

Preferably, the above dot spacers are composed of a mixture of two types of insulating dot spacers having average heights $G_1$ and $G_2$ different from each other ($G_1 > G_2$).

Further, in the writing pad of the present invention, it is preferred that the average center distance (L) between the dot spacers be varied depending on the radius of curvature (μm) of the tip of an input pen employed for depressing the input-side substrate of the writing pad. Preferably, the average center distance (L) between the dot spacers and/or the radius of curvature (R) of the tip of the input pen are controlled so that the average center distance (L) and the radius of curvature (R) satisfy the following relationship:

$$L \leq R/n$$

wherein n is a positive integer of 4 or greater.

The writing pad of the invention may be produced by a process comprising a step of forming droplets of a spacer forming solution comprising an organic solvent and, dissolved or dispersed therein, a nonconductive resin on a preheated electrode surface, and evaporating the organic solvent from the droplets to form insulating dot spacers on the electrode surface, wherein a height (G) of the dot spacers is not greater than 15 μm, a diameter (d) of the dot spacers on the electrode surface is greater than G (d>G), and an average center distance (L) between the adjacent dot spacers is not greater than 100 μm and 3 d<L<100 d.

Further, in the writing pad of the present invention, it is preferred that at least one of the pair of electrode surfaces be treated with an insulating chain organic polymeric compound having a functional group capable of bonding with a material composing the electrode.

This writing pad may be produced by a process comprising a step of applying a coating solution comprising an organic solvent and, dissolved or dispersed therein, an insulating chain organic polymeric compound having a functional group capable of bonding with a material composing the electrode to at least one of the pair of electrode surfaces and heating the substrate having the electrode applied the coating solution to dry, thereby effecting treatment of the electrode surface with the insulating chain organic polymeric compound.

The writing pad may also be produced by a process comprising a step of applying a first coating solution comprising a compound having both a group reactive with an inorganic compound (inorganic reactive group) and a group reactive with an organic compound (organic reactive group) in the same molecule to at least one of the pair of electrode surfaces, subsequently applying a second coating solution comprising a chain organic polymeric compound having a functional group reactive with the organic reactive group to the electrode surface applied the first coating solution and heating the substrate having the electrode applied the coating solution to dry, thereby effecting treatment of the electrode surface with the insulating chain organic polymeric compound.

BEST MODE FOR CARRYING OUT THE INVENTION

The writing pad of the present invention will now be illustrated in more detail with reference to the appended drawings.

Figure 1:
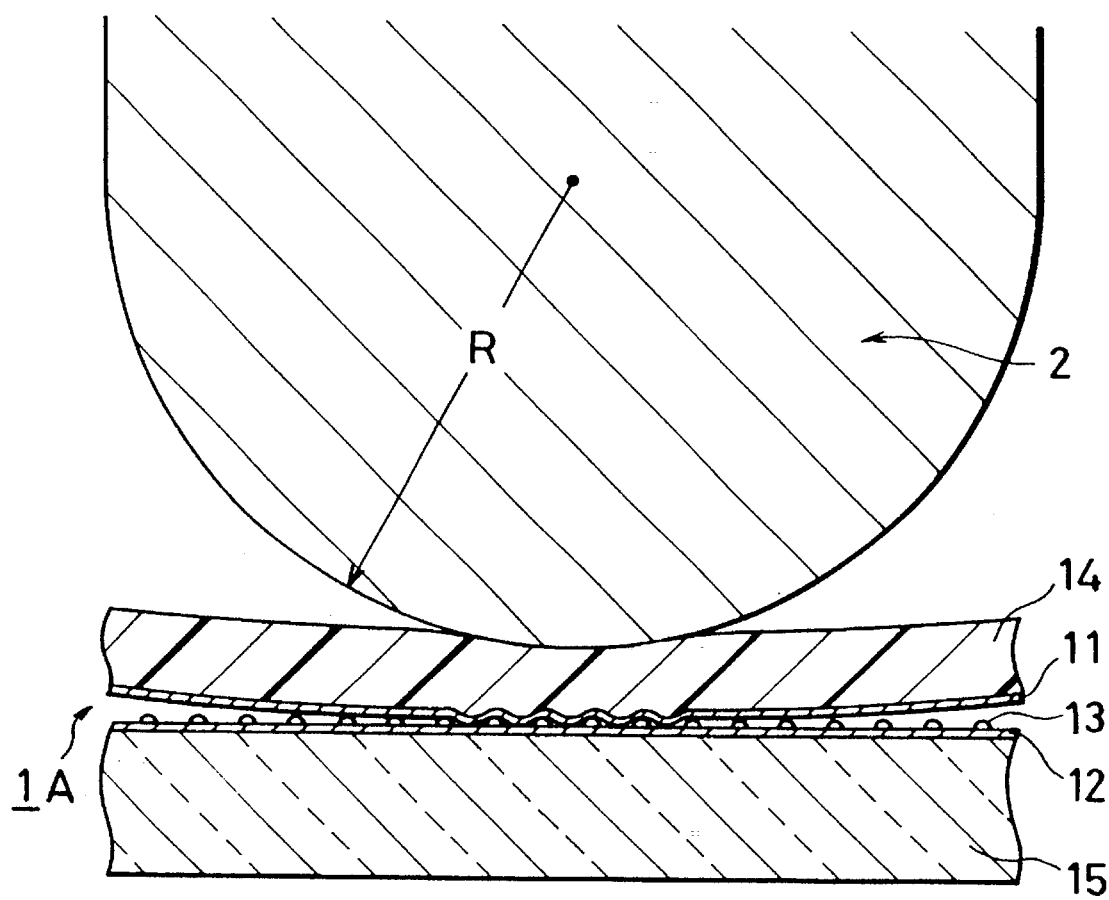
FIG. 1 is a cross-sectional view showing one embodiment of the writing pad according to the present invention.

FIG. 1 shows one embodiment of the writing pad according to the present invention.

In this writing pad 1A, an upper substrate 14 (input side) having an electrode 11 formed thereon and a lower substrate 15 having an electrode 12 formed thereon are disposed in such a way that both electrodes 11, 12 face one another with a predetermined gap between them by means of a plurality of insulating dot spacers 13.

The upper substrate 14 shown in FIG. 1 may be composed of a material with a considerable softness, for example, a plastic film such as a film of polyethylene terephthalate (hereinafter referred to simply as "PET film"). The top of the upper substrate 14 is adapted for permission to input images, such as characters and graphics, with an input pen. The back of the upper substrate 14 is provided with the electrode 11 composed of a conductive thin film, such as a thin film of ITO.

The upper substrate 14 having the electrode 11 formed thereon is not particularly limited as long as it is strained to a degree such that the upper and lower electrodes contact with each other at the position depressed by the tip of an input pen 2 when images are drawn with the input pen 2. The thickness of the upper substrate 14 meeting the above requirement, inclusive of the thickness of the electrode 11, is preferably in the range of 50 μm to 1 mm.

On the other hand, the lower substrate 15 may be composed of, for example, glass. One side of this substrate 15 is provided with an electrode 12 composed of a conductive thin film, such as a thin film of ITO.

This lower substrate 15 is not also particularly limited, and may be either flexible or rigid. Generally, however, it is preferred that the substrate be a transparent plate of, for example, glass.

In the writing pad 1A shown in FIG. 1, the dot spacers 13 are distributed on and fixed to the electrode 12 disposed on the lower substrate 15. This is not limitative, and the dot spacers 13 may be fixed to the electrode 11 disposed on the upper substrate 14. Also, the dot spacers may be fixed to both of the electrodes 11, 12.

In the present invention, it is not necessary to strongly bond the dot spacers to the electrode with an adhesive, etc., and it is satisfactory to fix the dot spacers by an appropriate method to a degree such that their free movement on the electrode is restricted. Such method, for example, may comprise forming dot spacers composed of a synthetic resin as described later and fusing the resin dot spacers to the electrode surface.

In the writing pad 1A shown in FIG. 1, the dot spacers 13, at their tops, contact the electrode 11. Thus, it is preferred that each of the dot spacers be hemispherical or conical with rounded tops. The dot spacers having pointed tops may unfavorably flaw and damage the electrode.

The dot spacers for use in the writing pad of the present invention may be rigid to a degree such that the shape thereof is not deformed even at the site depressed by the tip of an input pen. However, it is generally preferred that the dot spacers be soft to a degree such that they are slightly distorted and deformed in accordance with the depression by the input pen. Further, the dot spacers have such insulating properties that the upper and lower substrates are not electrically conducted therethrough. The dot spacers are preferably transparent like the upper and lower electrodes.

Figure 2:
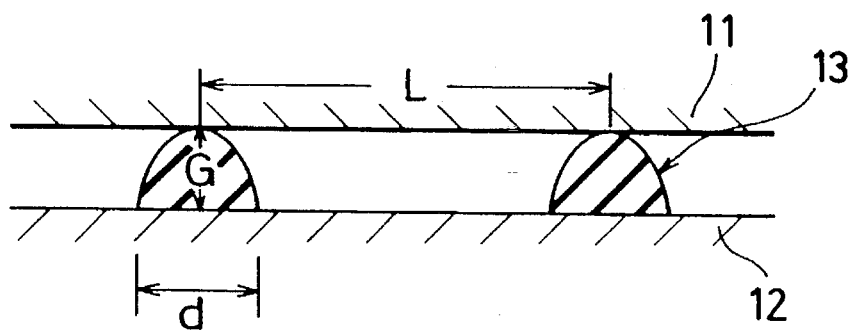
FIG. 2 is a partial enlarged cross-sectional view of FIG. 1.

With respect to the dot spacers for use in the writing pad of the present invention, it is preferred that the height (G) of the dot spacers 13, as shown in FIG. 2, be not greater than 15 µm, especially 1 to 10 µm, and the diameter (d) of the dot spacers 13 at their fixed sites on the surface of the electrode 12, i.e., the diameter (d) of the dot spacers (13) at their portions contacting the surface of the electrode 12, be not greater than G (d>G), especially d≧2 G. When the dot spacers 13 satisfy the above relationships, smooth mutual contacting of the upper and lower electrodes 11, 12 can be attained upon straining of the upper substrate 14 by the depression with the input pen 2.

Further, it is preferred that the average center distance (L) between the adjacent dot spacers 13 be not greater than 100 µm and 3 d<L<100 d, especially 4 d<L <20 d.

It is preferred that the heights (G) of the dot spacers 13 be substantially constant so as to uniformly space the upper and lower electrodes 11, 12 from each other throughout the both electrode surfaces. Thus, the use of dot spacers having substantially the same heights is preferred.

In the present invention, however, a mixture of at least two types of dot spacers having different average heights may be employed. When the heights of the higher dot spacers and the lower dot spacers are represented by $G_1$ and $G_2$, respectively, it is preferred that $G_2$ be greater than ½ $G_1$. The weight ratio of the higher dot spacers to the lower dot spacers is preferably in the range of 7/3 to 3/7. In the writing pad produced using such a mixture of dot spacers, even when fingers or other portions of a writer's hand touch to the upper substrate 14 of the writing pad with a load greater than that to be applied by an input pen upon inputting characters or graphics to the writing pad, erroneous inputtings to an image input unit (not shown) does not occur, and thus, erroneous operations thereof can be more effectively prevented.

In this embodiment as well, the heights $G_1$ and $G_2$ of the dot spacers are each not greater than 15 µm. When the diameters defined by the electrode surface of the dot spacers having the heights $G_1$ and $G_2$ are respectively represented by $d_1$ and $d_2$, $d_1>G_1$ and $d_2>G_2$. Further, the center distance (L) between the adjacent dot spacers should be 3 d<L<100 d and L≦100 µm independently of the type of dot spacers, i.e., irrespective of whether d is $d_1$ or $d_2$.

Further, in the writing pad 1A of the present invention, it is preferred that the average center distance (L) between the dot spacers 13 be varied depending on the radius of curvature R (µm) of the tip of an input pen 2 employed for depressing the upper substrate 14 of the writing pad 1. Preferably, the average center distance (L) between the dot spacers 13 satisfies the following relationship:

$$L \leq R/n$$

wherein n is a positive integer of 4 or greater.

Any input pens for inputting images in conventional handwritten image input units may be used for the present invention. When the radius of curvature (R) of the tip of an input pen used is too small, it is difficult to write on the upper substrate of the writing pad. On the other hand, when R is too large, the depression force required for inputting (writing pressure load) is too large, thereby rendering smooth inputting difficult. Therefore, it is preferred that the radius of curvature (R) of the tip of the input pen be in the range of about 0.1 mm to about 2.5 mm.

The material composing the insulating dot spacers is not particularly limited as long as it is an insulator. Preferably, the dot spacers are composed of one or more nonconductive resins, for example, selected from acrylic, epoxy, urethane and polyester resins.

The above writing pad of the present invention may be produced by a process comprising a step of forming droplets of a spacer forming solution comprising an organic solvent and, dissolved or dispersed therein, a nonconductive resin on a preheated electrode surface, and evaporating the organic solvent from the droplets to form dot spacers each having a height (G) not greater than 15 µm and being smaller than a diameter (d) thereof on the electrode surface (G<d), in which the average center distance (L) between the adjacent dot spacers is not greater than 100 µm and 3 d<L<100 d.

How to effect formation on an electrode surface and fixing thereto of the insulating dot spacers will now be described in detail. For example, it may be accomplished by spraying a spraying solution comprising a nonconductive resin as mentioned above dissolved or dispersed in an organic solvent to generate uniform droplets to hit the droplets against a preheated electrode and thereafter evaporating the organic solvent from the droplets. In this method, hemispherical dot spacers are formed on the electrode.

Organic solvents capable of dissolving the above nonconductive resins are preferably used in the preparation of the above spraying solution. Especially preferred are solvents having relatively low boiling points, such as ethanol, isopropanol, butanol, acetone, methyl ethyl ketone and ethyl acetate. These organic solvents may be used either individually or in combination.

The concentration of the resin component in the spraying solution depends on the type of employed resin component. For example, when the resin component is a polyester resin, it is preferred that the concentration of the resin component in the spraying solution be in the range of 1 to 10% by weight. On the other hand, when the resin component is an acrylic resin, it is preferred that the concentration of the resin component in the spraying solution be in the range of 1 to 20% by weight.

Inorganic compound particles, such as those of silica, alumina, titania and zirconia, may be dispersed in the spraying solution. In the dispersion of the inorganic compound particles in the spraying solution, the particles are preferably used in an amount of 1 to 30 parts by weight per 100 parts by weight of the resin component. When the amount of the inorganic compound particles is in the above range, by the use of the inorganic compound particles having a particle size smaller than the height of finally formed dot spacers, there can be obtained dot spacers each comprising inorganic compound particles covered with the above nonconductive resin.

In the spraying of the above spraying solution onto a given electrode surface, it is preferred that the electrode surface be preheated to maintain a preselectd temperature. Preferably, the temperature of the electrode surface is about 100° C. or lower. The height, diameter and center distance of the dot spacers formed on the electrode surface can be controlled by regulating the concentration of solid contents in the spraying solution, the spraying rate of the solution and the spraying pressure and time.

Also, the insulating dot spacers can be formed by a screen printing method in which an ink containing the above resin component is applied through a screen printing plate having a suitable opening size to the electrode surface, and other methods.

Figure 3:
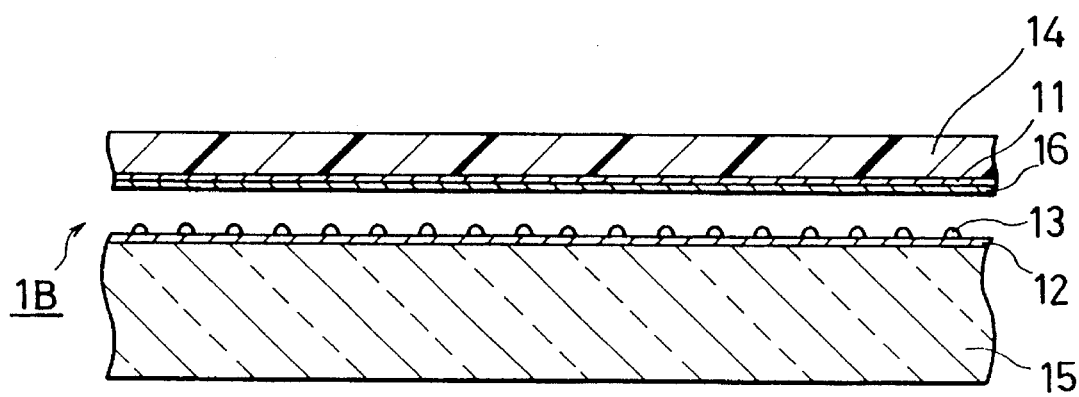
FIG. 3 is a cross-sectional view showing another embodiment of the writing pad according to the present invention; wherein, 1A, 1B: writing pad,
2: input pen,
11: upper electrode,
12: lower electrode,
13: insulating dot spacer,
14: upper substrate,
15: lower substrate,
16: layer of insulating chain organic polymeric compound, G: height of dot spacer,
d: diameter of dot spacer, and
L: center distance between the dot spacers.

FIG. 3 shows another embodiment of the writing pad of the present invention.

This writing pad 1B is the same as the writing pad 1A shown in FIG. 1, except that a layer 16 of an insulating chain organic polymer having a functional group capable of bonding with the material composing the electrode is formed on the surface of the electrode 11 disposed on the upper substrate 14.

The insulating chain organic polymeric compound forming the layer 16 is chemically bonded with the material composing the electrode 11, so that the surface of the electrode 11 is apparently covered with a fine-whiskery or networked insulating chain organic polymeric compound.

This layer 16 of an insulating chain organic polymer may also be disposed on the surface of the electrode 12 provided on the lower substrate 15. The above surface treatment for forming the layer 16 of an insulating chain organic polymer on the surface of at least one of the electrodes 11, 12 decreases the friction between the electrodes 11, 12 by virtue of the insulating chain organic polymeric compound, thereby effecting durability improvement.

The chain organic polymeric compound for use in the surface treatment of the electrode 11 and/or the electrode 12 has at least one functional group capable of bonding with the material composing the electrode per molecule at its molecular terminal and/or in its molecular chain.

Compounds suitable for forming the principal chain of the chain organic polymeric compound having a functional group capable of bonding with the material composing the electrode, include, for example, polyethylene, polypropylene, polystyrene, polyvinyl chloride, polyvinyl acetate, polyvinyl acetal, polyacrylic acid, polymethacrylic acid, polyacrylic esters such as polymethyl acrylate, polymethacrylic esters such as polymethyl methacrylate, polyacrylonitrile, polyacrylamide, polytetrafluoroethylene, polyvinylidene fluoride, polybutadiene, polyisoprene, propylene-ethylene copolymer, ethylene-vinyl acetate copolymer, polycarbonate, polyethylene terephthalate, aromatic polyesters, polyethylene oxide.

A transparent writing pad is widely utilized, which comprises upper and lower substrates each having an electrode of an inorganic compound formed thereon. For the treatment of the electrode composed of an inorganic compound, there can be used a chain organic polymeric compound having an inorganic reactive group), e.g., a hydroxyl or alkoxy group, as the functional group capable of bonding with the material composing the electrode.

The above inorganic reactive group includes various functional groups, e.g., those of the formula:

$$-\underset{(R_2)_b}{\overset{(R_1)_a}{\underset{|}{\mathrm{Si}}}}-(OR_3)_c \qquad [\mathrm{I}]$$

wherein each of $R_1$, $R_2$ and $R_3$ independently is a hydrogen atom or an alkyl group having 1 to 4 carbon atoms; and each of a and b is an integer of 0 to 2 and c is an integer of 1 to 3, provided that a+b+c=3.

The polymeric compound bonds at the site of the —$OR_3$ group (hydroxyl or alkoxy group) of the formula [I] with the inorganic compound composing the electrode. Functional groups each containing Ti or Zr in place of Si may also be utilized.

The chain organic polymeric compound having a functional group capable of bonding with the material composing the electrode preferably has a number average molecular weight of 1,000 to 200,000, especially 10,000 to 100,000. The use of the chain organic polymeric compound having a number average molecular weight of less than 1,000 for the treatment of electrode cannot decrease the friction between the electrodes of the writing pad generated upon inputting images to the writing pad with an input pen. Therefore, in the writing pad having its electrode treated with such chain organic polymeric compound, it is not feasible to satisfactorily reduce the damage brought about at both of the electrodes when a vast plurality of sliding inputs are conducted with an input pen. On the other hand, in the writing pad having its electrode treated with the chain organic polymeric compound having a number average molecular weight of greater than 200,000, the input load required for the pen inputting to the writing pad is likely to be too large, so that it be impossible to input images with an input pen.

Among the chain organic polymeric compounds each having a functional group capable .of bonding with the material composing the electrode, a chain organic polymeric compound for use in the surface treatment of the electrode of an inorganic compound may be synthesized from a compound having both inorganic and organic reactive groups in the same molecule, such as silane and titanium coupling agents, and a chain organic compound having a functional group reactive with the organic reactive group.

With respect to the silane coupling agent, further description will be made.

(a) First, a functional group reactive with an amino, vinyl or epoxy group of the silane coupling agent is introduced in the molecular terminal and/or the molecular chain of a chain organic polymeric compound. For example, when a silane coupling agent having an amino group is employed, a carboxyl group reactive with the amino group is introduced in the above molecular terminal and/or the molecular chain of a chain organic polymeric compound.

(b) Subsequently, the resultant chain organic polymeric compound having the above functional group introduced is reacted with the silane coupling agent.

In the treatment of the electrode surface with the use of the thus obtained insulating chain organic polymeric compound having a functional group capable of bonding with the material composing the electrode, a coating solution comprising an organic solvent and, dissolved or dispersed therein, the above chain organic polymeric compound having the functional group capable of bonding with the material composing the electrode, is applied to the electrode surface by application means, such as a bar coater, a spinner, a roll coater or a dipping bath, and thereafter the substrate with the electrode applied the coating solution is heated for drying.

In the preparation of the above coating solution, there may be used, preferably, organic solvents having relatively low boiling points, such as ethanol, isopropanol, butanol, acetone, methyl ethyl ketone and ethyl acetate. These organic solvents may be used either individually or in combination.

The resistance to scuffing and concentration of the chain organic polymeric compound in the coating solution is preferably in the range of 0.1 to 10% by weight.

The durability of the electrodes of the writing pad and the minimum input load required for the image inputting to the writing pad can be regulated by changing the concentration of the chain organic polymeric compound.

For example, when the concentration of the chain organic polymeric compound is less than 0.1% by weight, the amount of the insulating organic polymeric compound bonding with the electrode surface is not sufficient, so that cases may arise where desirable durability cannot be imparted to the electrodes of the writing pad. On the other hand, when the concentration of the chain organic polymeric compound exceeds 10% by weight, the amount of the insulating organic polymeric compound bonding with the electrode surface is so large that a large input load becomes inevitable for inputting images to the writing pad. Thus, an excessive amount of the insulating organic polymeric compound may result in that it is impossible to input images to the writing pad even with a maximally increased input load by an input pen.

In the heating for drying of the substrate with the electrode applied the coating solution, it is preferred that the temperature of the electrode surface be in the range of 100° to 150° C.

The treatment of the electrode surface with the chain polymeric compound can also be conducted by the following method.

First, the electrode surface is coated with a coating solution containing a compound having both an inorganic reactive group and an organic reactive group in the same molecule, such as a silane coupling agent, to react the inorganic reactive group of the compound with the material composing the electrode. Subsequently, the electrode surface thus coated is further coated with a coating solution containing a chain polymeric compound having a functional group reactive with the organic reactive group of the compound, such as a silane coupling agent, the functional group being introduced in the molecular terminal or chain thereof in the method described hereinbefore, to react the functional group of the chain polymeric compound with the organic reactive group of the former compound. Thus, the electrode treated with the insulating chain polymeric compound is obtained.

In the writing pad of the present invention, one of the pair of electrode surfaces of the writing pad may be treated with the above insulating chain organic polymeric compound, with the other electrode surface having the insulating dot spacers formed thereon.

Further, the writing pad of the present invention may be provided with a substrate having an electrode attached thereto, which is either one in which the electrode surface is first treated with the insulating chain organic polymer compound and the insulating dot spacers are then formed thereon, or one in which the insulating dot spacers are first formed on the electrode surface and the electrode surface having the dot spacers thus formed is then treated with the insulating chain organic polymeric compound.

Effect of the Invention

By the process for producing a writing pad according to the present invention, an writing pad is obtained which comprises a pair of substrates each having an electrode formed on one of the surfaces thereof, the pair of substrates being disposed in parallel in such a way that the electrodes face one another with a predetermined gap between the substrates by means of a plurality of insulating dot spacers having a predetermined height, diameter and center distance, the dot spacers being fixed to at least one of the electrode surfaces.

In the writing pad of the present invention, the height, diameter and center distance of the insulating dot spacers are specifically designed not to give the upper substrate any significant flexibility, so that even if fingers or other portions of a writer's hand inadvertently come into contact with the surface of the upper substrate (input-side substrate) of the writing pad at the time of inputting characters and graphics with an input pen, an erroneous input due to such a contact to the writing pad can be prevented.

That is, when the upper substrate of the writing pad is depressed with an input pen, the tip of the input pen is supported through the input-side substrate by the dot spacers, because the distance between the adjacent dot spacers is small as compared with that of the conventional writing pad, so that the upper substrate does not suffer from any substantial flexibility. However, a strain deformation occurs only at a locality of the upper substrate inclusive of the electrodes, depressed by the input pen. This locally generated strain deformation of the upper substrate cooperates with the strain deformation of the dot spacers to realize mutual contact of the upper and lower electrodes of the writing pad.

In the writing pad of the present invention, the height of the dot spacers is small to a degree such that the upper electrode can be brought into contact with the lower electrode by the strain deformation. However, even at such the small height of the dot spacers, the upper substrate does not cause by its own wight to contact the upper and lower electrodes with each other, because the distance between the adjacent dot spacers is small.

When the upper substrate of the writing pad is depressed with a finger or other portions of a writer's hand, the area of the upper substrate brought into contact with the finger, etc. is greater than that brought into contact with an input pen at the time of image inputting. Thus, if the load applied to the input pen is identical with that applied to the finger, etc. (erroneous input load), the pressure applied to the upper substrate by the finger, etc. is smaller than that applied by the input pen, because the finger, etc. have a radius of curvature greater than that of the input pen tip. For these reasons, much greater load is required for inputting with the fingers, etc. than with the input pen.

Therefore, in the writing pad of the present invention, a load as applied to the upper substrate by inadvertent contact of fingers, etc., of a writer's hand cannot serve as an actual input load, so that an erroneous input by fingers, etc., can be effectively prevented.

Further, in the writing pad of the present invention, the substrates are not flexed so that occurrence of erroneous operations by repeated inputs can be obviated.

The writing pad of the present invention having the above advantageous properties is suitable for use as an image input unit for a writing apparatus, such as a handwritten-character-recognizing optical character reader and CAD.

Still further, when the faceplate of the writing pad is transparent, that is, when not only are the upper and lower electrodes employed for composing the writing pad, inclusive of supports therefor, transparent but also the insulating dot spacers interposed between the upper and lower electrodes are transparent, by mounting of the writing pad on the screen of a display unit, it can be realized that a handwritten image formed on the writing pad is visually checked on the screen of the display unit through the writing pad, as in the preparation of conventional hard copy by handwriting.

Moreover, by treating at least one of the two electrode surfaces of the writing pad with an insulating chain organic polymeric compound having a functional group capable of bonding with the material composing the electrode, the friction between the electrodes attributed to sliding inputs (inputs with a pen) can be minimized to improve the durability of both the electrodes.

The present invention will now be illustrated with reference to the following Examples, by which the present invention is in no way limited.

EXAMPLE 1

Using a molding of indium oxide containing 5% by weight of tin oxide, a vapor deposition was carried out onto a film of polyethylene terephthalate (PET) of 25 µm in thickness preheated at 100° C. by means of a 2 kW electron gun under the conditions such that the deposition rate was 3 Å/sec and that the partial pressure of oxygen was $3 \times 10^{-4}$ torr, thereby obtaining a PET $F_0$ film having a transparent electrode formed thereon.

Subsequently, the same procedure as above was repeated except that a glass plate having a thickness f 1.1 mm was used in place of the PET film, which was preheated at 400° C., thereby obtaining a glass plate $G_0$ having a transparent electrode formed thereon.

Onto the surface of the electrode of the thus obtained glass plate with electrode $G_0$, a spraying solution comprising 960 parts by weight of methyl ethyl ketone containing 40 parts by weight of polyester resin (VYLON produced by Toyobo Co., Ltd.) was sprayed from a distance of 1 m from the electrode surface for 1 min while heating the glass plate to keep the temperature of the electrode surface at 60° C. under the conditions such that the spraying flow rate was 30 ml/min and that the pressure was 2 kg/cm². After the spraying, the resultant plate was dried at 120° C. to thereby obtain a glass plate with electrode $G_1$ having hemispherical insulating dot spacers formed on the electrode surface.

The diameter (d) of the dot spacers on the electrode surface and the center distance (L) between the adjacent dot spacers were determined by taking an electron micrograph of the electrode surface having the dot spacers formed thereon and by averaging measurements with respect to 10 dot spacers. In addition, the height (G) of dot spacers was measured by the use of a tracer-type surface roughness tester. (SURFCOM manufactured by Tokyo Seimitsu Co.)

The results are shown in Table 1.

Thereafter, the PET film with electrode $F_0$ was disposed on the surface of the electrode of the glass plate with electrode $G_1$ so as to be brought the electrode surface of the PET film with electrode $F_0$ into contact with the dot spacers, thereby obtaining a writing pad in which the electrode of the PET film with electrode $F_0$ was an upper electrode (input-side) while the electrode of the glass plate with electrode $G_1$ was a lower electrode.

With respect to the obtained writing pad, the following properties were evaluated.

(1) Required Input Load

The PET film supporting the upper electrode was depressed by applying a load perpendicular to the PET film with each of polyacetal resin depressing pen respectively having tips with radii of curvature (R) of 1 mm and 2 mm. The change of the resistance between the upper and lower electrodes was measured while gradually increasing the perpendicular load. A load value at which the resistance was 2 kΩ or lower was determined, and evaluated as the load required for inputting to the writing pad with an input pen.

(2) Erroneous input Load

The PET film supporting the upper electrode was depressed by applying a load perpendicular to the PET film with a silicone resin depressing pen having a tip with a radius of curvature (R) of 10 mm and having a hardness of 60. The change of the resistance between the upper and lower electrodes was measured while gradually increasing the perpendicular load. A load value at which the resistance was 2 kΩ or lower was determined, and evaluated as the load generating noise by an erroneous input by a portion of a writer's hand when he inputs images to the writing pad with an input pen while touching the portion of his hand to the pad.

(3) Durability

The PET film supporting the upper electrode was depressed by a commercially available ball-point pen under a load of 300 g, and, while keeping the load, the pen was reciprocally slid on the film until the linearity of the image became poor. The number of reciprocating slidings made before the occurrence of the poor linearity was evaluated as the durability of the writing pad.

The results are also shown in Table 1.

EXAMPLE 2

The same procedure as in Example 1 was repeated except that a spraying solution comprising 960 parts by weight of methyl ethyl ketone containing 100 parts by weight of polyester resin (VYLON produced by Toyobo Co., Ltd.) was used and that the spraying time was 50 sec, thereby obtaining a glass plate with electrode $G_2$ having insulating dot spacers formed on the electrode surface. With respect to the resultant glass plate with electrode, the height (G) of dot spacers, the diameter (d) of the dot spacers on the electrode surface (d) and center distance (L) between the the adjacent dot spacers were measured in the same manner as in Example 1.

The results are shown in Table 1.

A writing pad was produced in the same manner as in Example 1 except that use was made of the above glass plate with electrode $G_2$ having insulating dot spacers formed on the electrode surface was used. The same evaluations of properties as in Example 1 were conducted with respect to the produced writing pad.

The results are also shown in Table 1.

EXAMPLE 3

Onto the surface of the electrode of the glass plate with electrode $G_0$ obtained in Example 1, a spraying solution comprising 960 parts by weight of methyl ethyl ketone containing 30 parts by weight of acrylic resin (Acrydic A-433 produced by Dainippon Ink Chemicals, Inc.) and 20 parts by weight of melamine resin (Super-Beckamin L-105 produced by Dainippon Ink Chemicals, Inc.) was sprayed from a distance of 1 m from the electrode surface for 1.5 min while heating the glass plate to keep the temperature of the electrode surface at 80° C. under the conditions such that the spraying flow rate was 20 ml/min and that the pressure was 2 kg/cm². After the spraying, the resultant plate was dried at 150° C. to thereby obtain a glass plate with electrode $G_3$ having hemispherical insulating dot spacers formed on the electrode surface. With respect to the resultant glass plate with electrode, the height (G) of the dot spacers, the diameter (d) of the dot spacers on the electrode surface and the center distance (L) between the adjacent dot spacers were measured in the same manner as in Example 1.

The results are shown in Table 1.

A writing pad was produced in the same manner as in Example 1 except that the above glass plate with electrode $G_3$ having insulating dot spacers formed on the electrode surface was used. The same evaluations of properties as in Example 1 were conducted with respect to the produced writing pad.

The results are also shown in Table 1.

EXAMPLE 4

The same procedure as in Example 3 was repeated except that the spraying pressure was 3 kg/cm$^2$, thereby obtaining a glass plate with electrode G$_4$ having dot spacers formed on the electrode surface. With respect to the resultant glass plate with electrode, the height (G) of the dot spacers, the diameter (d) of the spacers on the electrode surface and the center distance (L) between the adjacent dot spacers were measured in the same manner as in Example 1.

The results are shown in Table 1.

A writing pad was produced in the same manner as in Example 1 except that the above glass plate with electrode G$_4$ having dot spacers formed on the electrode surface was used. The same evaluations of properties as in Example 1 were conducted with respect to the writing pad.

The results are also shown in Table 1.

EXAMPLE 5

The same procedure as in Example 3 was repeated except that the spraying flow rate was 30 ml/min, hereby obtaining a glass plate with electrode G$_5$ having dot spacers formed on the electrode surface. With respect to the resultant glass plate with electrode, the height (G) of the dot spacers, the diameter (d) of the dot spacers on the electrode surface and the center distance (L) between the dot spacers were measured in the same manner as in Example 1.

The results are shown in Table 1.

A writing pad was produced in the same manner as in Example 1 except that use was made of the above glass plate with electrode G$_5$ having dot spacers formed on the electrode surface was used. The same evaluations of properties as in Example 1 were conducted with the writing pad.

The results are also shown in Table 1.

EXAMPLE 6

The same procedure as in Example 3 was repeated except that the spraying time was 1 min, thereby obtaining a glass plate with electrode G$_6$ having dot spacers formed on the electrode surface. With respect to the resultant glass plate with electrode, the height (G) of the dot spacers, the diameter (G) of the dot spacers, the diameter (d) of the spacers on the electrode surface and the center distance (L) between the adjacent dot spacers were measured in the same manner as in Example 1.

The results are shown in Table 1.

A writing pad was produced in the same manner as in Example 1 except that the above glass plate with electrode G$_6$ having dot spacers formed on the electrode surface was used. The same evaluations of properties as in Example 1 were conducted with respect to the writing pad. The results are also shown in Table 1.

EXAMPLE 7

The same procedure as in Example 2 was repeated except that the spraying solution was sprayed while keeping the temperature of the surface of the electrode formed on the glass plate at 80° C. by heating the glass plate with electrode G$_0$, thereby obtaining a glass plate with electrode G$_7$ having dot spacers formed on the electrode surface. With respect to the resultant glass plate with electrode, the height (G) of the dot spacers, the diameter (d) of the dot spacers on the electrode surface and the center distance (L) between the adjacent dot spacers were measured in the same manner as in Example 1.

The results are shown in Table 1.

A writing pad was produced in the same manner as in Example 1 except that use was made of the above glass plate with electrode G$_7$ having dot spacers formed on the electrode surface was used. The same evaluations of properties as in Example 1 were conducted with respect to the writing pad.

The results are also shown in Table 1.

EXAMPLE 8

Onto the surface of the electrode of the glass plate with electrode G$_0$ obtained in Example 1, a spraying solution comprising 960 parts by weight of methyl ethyl ketone containing 3 parts by weight of spherical silica particles (SHINSHIKYU-SW with an average particle size of 2 μm produced by Catalysts & Chemicals Industries Co., Ltd.) and 40 parts by weight of polyester resin (VYLON produced by Toyobo Co., Ltd.) was sprayed from a distance of 1 m from the electrode surface for 1 min while heating the glass plate to keep the temperature of the electrode surface at 60° C. under the conditions such that the spraying flow rate was 30 ml/min and that the pressure was 2 kg/cm$^2$. After the spraying, the resultant plate was dried at 120° C. to thereby obtain a glass plate with electrode G$_8$ having hemispherical insulating dot spacers, each comprising silica particles covered with the polyester resin, formed on the electrode surface. With respect to the resultant glass plate with electrode, the height (G) of the dot spacers, the diameter (d) of the dot spacers on the electrode surface and the center distance (L) between the adjacent dot spacers were measured in the same manner as in Example 1.

The results are shown in Table 1.

A writing pad was produced in the same manner as in Example 1 except that use was made of the above glass plate with electrode G$_8$ having dot spacers formed on the electrode surface was used. The same evaluations of properties as in Example 1 were conducted with respect to the produced writing pad.

The results are also shown in Table 1.

EXAMPLE 9

Onto the surface of the electrode of the glass plate with electrode G$_0$ obtained in Example 1, a spraying solution comprising 960 parts by weight of methyl ethyl ketone containing 3 parts by weight of spherical divinylbenzene resin particles (Micropearl SP with an average particle size of 4.25 μm produced by Sekisui Chemical Co., Ltd.), 30 parts by weight of acrylic resin (Acrydic A-405 produced by Dainippon Ink Chemicals, Inc.) and 20 parts by weight of melamine resin (Super-Beckamin L-105 produced by Dainippon Ink Chemicals, Inc.) was sprayed from a distance of 1 m from the electrode surface for 1 min while heating the glass plate to keep the temperature of the electrode surface at 80° C. under the conditions such that the spraying flow rate was 30 ml/min and that the pressure was 3 kg/cm$^2$. After the spraying, the resultant plate was dried at 150° C. to thereby obtain a glass plate with electrode G$_9$ having hemispherical insulating dot spacers, each comprising resin particles covered with the acrylic and melamine resins, formed on the electrode surface. With respect to the resultant glass plate with electrode, the height (G) of the dot spacers, the diameter (d) of the dot spacers on the electrode surface and the center distance (L) between the adjacent dot spacers were measured in the same manner as in Example 1.

The results are shown in Table 1.

A writing pad was produced in the same manner as in Example 1 except that the above glass plate with electrode $G_9$ having dot spacers formed on the electrode surface was used. The same evaluations of properties as in Example 1 were conducted with respect to the produced writing pad.

The results are also shown in Table 1.

EXAMPLE 10

Onto the surface of the electrode of the glass plate with electrode $G_0$ obtained in Example 1, a spraying solution comprising 960 parts by weight of methyl ethyl ketone containing 1 and 5 parts by weight of two types of spherical silica particles (SHINSHIKYU-SW produced by Catalysts & Chemicals Industries Co., Ltd.) having average particle sizes of 1 and 5 μm, respectively, and 50 parts by weight of polyester resin (VYLON produced by Toyobo Co., Ltd.) was sprayed from a distance of 1 m from the electrode surface for 1 min while heating the glass plate to keep the temperature of the electrode surface at 60° C. under the conditions such that the spraying flow rate was 30 ml/min and that the pressure was 2 kg/cm$^2$. After the spraying, the resultant plate was dried at 120° C. to thereby obtain a glass plate with electrode $G_{10}$ having two types of hemispherical insulating dot spacers different in height, each comprising silica particles covered with the polyester resin, formed on the electrode surface. With respect to the resultant glass plate with electrode, the heights of the two types of dot spacers ($G_1$), ($G_2$), the diameters ($d_1$), ($d_2$) of the dot spacers on the electrode surface and the center distance (L) between the adjacent dot spacers were measured in the same manner as in Example 1.

The results are shown in Table 1.

A writing pad was produced in the same manner as in Example 1 except that use was made of the above glass plate with electrode $G_{10}$ having dot spacers formed on the electrode surface was used. The same evaluations of properties as in Example 1 were conducted with respect to the produced writing pad.

The results are also shown in Table 1.

EXAMPLE 11

Onto the surface of the electrode of the glass plate with electrode $G_0$ obtained in Example 1, a spraying solution comprising 960 parts by weight of methyl ethyl ketone containing 30 parts by weight of acrylic resin (Acrydic A-433 produced by Dainippon Ink Chemicals, Inc.) and 20 parts by weight of melamine resin (Super-Beckamin L-105 produced by Dainippon Ink Chemicals, Inc.) was sprayed from a distance of 1 m from the electrode surface for 1 min while heating the glass plate to keep the temperature of the electrode surface at 80° C. under the conditions such that the spraying flow rate was 10 ml/min and that the pressure was 3 kg/cm$^2$. Subsequently, the same spraying solution was sprayed from a distance of 1 m from the electrode surface for 30 sec under the conditions such that the spraying flow rate was 25 ml/min and that the pressure was 2 kg/cm$^2$. After the sprayings, the resultant plate was dried at 150° C. to thereby obtain a glass plate with electrode $G_{11}$ having two types of hemispherical insulating dot spacers different from each other in height formed on the electrode surface. With respect to the resultant glass plate with electrode, the heights ($G_1$), ($G_2$) of the two types of the dot spacers, the diameters ($d_1$), ($d_2$) of the dot spacers on the electrode surface and the center distance (L) between the adjacent dot spacers were measured.

The results are shown in Table 1.

A writing pad was produced in the same manner as in Example 1 except that the above glass plate with electrode $G_{11}$ having dot spacers formed on the electrode surface was used. The same evaluations of properties as in Example 1 were conducted with respect to the produced writing pad.

The results are also shown in Table 1.

Comparative Example 1

The same procedure as in Example 2 was repeated except that the spraying solution was sprayed for 8 sec while keeping the temperature of the surface of the electrode formed on the glass plate at 120° C. by heating the glass plate with electrode $G_0$ obtained in Example 1, thereby obtaining a glass plate with electrode $G_a$ having dot spacers formed on the electrode surface. With respect to the resultant glass plate, the height (G) of the dot spacers, the diameter (d) of the dot spacers on the electrode surface and the center distance (L) between the adjacent dot spacers were measured in the same manner as in Example 1.

The results are shown in Table 1.

A writing pad was produced in the same manner as in Example 1 except that use was made of the above glass plate with electrode $G_a$ having dot spacers formed on the electrode surface was used. The same evaluations of properties as in Example 1 were conducted with respect to the writing pad. The results are also shown in Table 1.

Comparative Example 2

An insulating paste (1000 Medium produced by Jujo Chemical Co., Ltd.) was printed onto the glass plate with electrode $G_0$ obtained in Example 1 by the use of a screen printing plate having an opening diameter of 150 μm and a pitch of 5 mm, and dried at 120° C., thereby obtaining a glass plate with electrode $G_b$ having dot spacers formed on the electrode surface. With respect to the resultant glass plate with electrode, the height of dot spacers (G), the diameter (d) of the spacers on the electrode surface and the center distance (L) between the adjacent dot spacers were measured in the same manner as in Example 1.

The results are shown in Table 1.

A writing pad was produced in the same manner as in Example 1 except that use was made of the above glass plate with electrode $G_b$ having dot spacers formed on the electrode surface was used. The same evaluations of properties as in Example 1 were conducted with respect to the writing pad.

The results are also shown in Table 1.

TABLE 1

|  | Insulating Dot Spacer | | | Writing Pad | | | |
|---|---|---|---|---|---|---|---|
|  | | | | Required Input Load | | Erroneous Input | |
|  | G | d | L | (g) | | Load (g) | Durability |
|  | (μm) | (μm) | (μm) | R = 1 mmφ | R = 2 mmφ | R = 10 mmφ | (times) |
| Example 1 | 3 | 10 | 60 | 60 | 170 | 2,000 | 30,000 or more |
| Example 2 | 5 | 20 | 90 | 80 | 240 | 3,000 | 30,000 or more |
| Example 3 | 2 | 10 | 50 | 60 | 170 | 2,000 | 30,000 or more |
| Example 4 | 1.5 | 8 | 45 | 50 | 150 | 2,000 | 30,000 or more |
| Example 5 | 2.5 | 12 | 70 | 50 | 160 | 2,500 | 30,000 or more |
| Example 6 | 2 | 10 | 100 | 35 | 70 | 1,400 | 30,000 or more |
| Example 7 | 9.5 | 18 | 90 | 90 | 290 | 4,500 | 30,000 or more |
| Example 8 | 3 | 9 | 60 | 50 | 140 | 1,500 | 30,000 or more |
| Example 9 | 6 | 15 | 70 | 60 | 190 | 2,500 | 30,000 or more |
| Example 10 | $G_1 = 0.7$<br>$G_2 = 6$ | $d_1 = 5$<br>$d_2 = 15$ | 50 | 80 | 270 | 5,000 | 30,000 or more |
| Example 11 | $G_1 = 0.7$<br>$G_2 = 2.5$ | $d_1 = 5$<br>$d_2 = 12$ | 50 | 60 | 200 | 3,500 | 30,000 or more |
| Comparative Example 1 | 16 | 16 | 500 | 30 | 40 | 80 | 500 |
| Comparative Example 2 | 20 | 150 | 5,000 | 30 | 30 | 40 | 100 |

As apparent from Table 1, all the values of erroneous input load of the writing pads of Examples 1 to 11 are evaluated to be as high as greater than 1 kg. By contrast, both the values of erroneous input load of the writing pads of Comparative Examples 1 and 2 are evaluated to be as low as less than 100 g. These show that, in image input units utilizing the writing pads of the present invention, there would be substantially no occurrence of any erroneous operation attributed to an erroneous input by portions of a writer's hand.

Moreover, all the durability values, in terms of the number of repeated inputs, of the writing pads of the present invention are evaluated to be as high as 30,000 or more. By contrast, both the durability values, in terms of the number of repeated inputs, of the writing pads of Comparative Examples 1 and 2 are evaluated to be as low as 500 or less. These demonstrate the advantage of the writing pads of the present invention in input durability.

EXAMPLE 12

Synthesis of Chain Polymeric Compound A

Placed in a four-necked flask were 20 g of polyoxyethylene methyl ether (POE) having a number average molecular weight of $5.0 \times 10^3$ and 8 g of succinic anhydride. Subsequently, the inside of this four-necked flask was deaerated, and nitrogen gas was introduced thereinto to create a nitrogen gas atmosphere inside the flask. Thereafter, 120 g of 1,2-dichloroethane as a solvent and 1 g of pyridine as a catalyst were added to the four-necked flask. The mixture was stirred at 80° C. for 72 hr, and the resultant reaction mixture was filtered by suction filter. From the thus obtained filtrate, the 1,2-dichloroethane and pyridine were removed by an evaporator to obtain a white powdery reaction product. This white powder was dissolved in 40 g of water, and diethyl ether was added to the aqueous solution to separate the solution into a water phase and an organic phase. Chloroform was added to the obtained water phase, followed by separation into a water phase and a chloroform phase, to extract the reaction product contained in the water phase with chloroform. Chloroform was evaporated off from the chloroform phase to obtain a reaction product, which was dissolved in benzene. Dimethyl ether was added to the benzene solution of the reaction product, and cooled on ice to obtain white precipitate of a purified reaction product. This white precipitate was separated by suction filtering and dried in vacuo, thereby obtaining purified polyoxyethylene methyl succinate having carboxyl groups.

A mixture of 10 g of the thus obtained polyoxyethylene methyl succinate, 400 g of chloroform as a solvent and 1.06 g of dicyclohexylcarbodiimide as a catalyst was stirred in a round bottom flask while cooling in an ice bath for 2 hr. Thereafter, 1.36 g of aminopropyltriethoxysilane was added to the mixture, and allowed to stand still at 5° C. for 24 hr to achieve reaction. Chloroform was evaporated off from the resultant reaction mixture, and benzene was added thereto to obtain a benzene solution of a reaction product. Diethyl ether was added to the benzene solution, and cooled on ice to obtain white precipitate of the reaction product. This white precipitate was dissolved in ethyl acetate, and undissolved precipitate residue was removed from the ethyl acetate solution by suction filtering. The ethyl acetate was evaporated off by an evaporator from the filtrate, and the thus obtained solid was dried in vacuo. Thus, chain polymeric compound A comprising POE as a principal chain was obtained.

Production and Evaluation of Writing Pad 50 g of the above chain polymeric compound A was gradually added to 950 g of tetrahydrofuran at room temperature under stirring, thereby obtaining a dispersion of the chain polymeric compound A.

The PET film with electrode $F_0$ obtained in Example 1 was immersed in this dispersion, and the PET film was lifted from the dispersion at a rate of 2 mm/sec, followed by heating at 120° C. for 30 min to dry the same. Thus, a PET film with electrode $F_1$ having the electrode surface treated with the chain polymeric compound A was obtained.

A metal ball having a diameter of 10 mm was put on the electrode surface of the PET film with electrode $F_1$, and the coefficient of friction and the resistance to scuffing exhibited when each of perpendicular loads of 20, 40, 60 and 80 g was applied to the metal ball were measured by the use of a surface property testing machine (HAIDON-14 manufactured by Shinto Scientific Co., Ltd.). In the measurement of the resistance to scuffing, the metal ball was caused to have one sliding rotation on the electrode surface while applying the above load, and whether or not the electrode surface was flawed was observed under a microscope. When the electrode surface was not flawed, the resistance to scuffing was evaluated as being good.

The results are shown in Table 2.

Thereafter, the PET film with electrode $F_1$ was disposed on the surface of the electrode of the glass plate with electrode $G_1$ obtained in Example 1 so as to contact the chain polymeric compound A on the electrode surface of the PET film with electrode $F_1$ with the insulating dot spacers (formed on the electrode surface) of the glass plate with electrode $G_1$, thereby obtaining a writing pad in which the electrode of the PET film with electrode $F_1$ was an upper electrode (input-side) while the electrode of the glass plate with electrode $G_1$ was a lower electrode.

With respect to the obtained writing pad, the required input load, the erroneous input load and the durability were evaluated in the same manner as in Example 1.

The results are shown in Table 3.

EXAMPLE 13

Synthesis of Chain Polymeric Compound B

The inside of a three-necked flask was deaerated, and nitrogen gas was introduced thereinto to create a nitrogen gas atmosphere inside the flask. Thereafter, 20 g of styrene purified by vacuum distillation, 0.4 g of 3-mercaptopropionic acid, 0.82 g f 2,2'-azobisisobutyronitrile and 40 g of anhydrous tetrahydrofuran as a solvent were placed in the three-necked flask. The mixture was reacted at 70° C. for 6 hr with stirring, and the solvent was evaporated off from the resultant reaction mixture to obtain a white powdery reaction product. This white powder was dissolved in benzene, and methanol was added to the benzene solution and cooled on ice to obtain white precipitate of a reaction product. This white precipitate was separated by suction filtering, and dried in vacuo to obtain 16.3 g of purified polystyrene (PSt) halving carboxyl terminal groups. The number average molecular weight of the obtained PSt was measured by gel permeation chromatography (GPC), which is found to be $12 \times 10^4$.

A mixture of 5.75 g of the thus obtained PSt, 100 g of chloroform as a solvent and 0.1 g of dicyclohexylcarbodiimide as a catalyst was stirred in a round bottom flask while cooling in an ice bath for 2 hr. Thereafter, 0.13 g of aminopropyltriethoxysilane was added to the mixture, and allowed to stand still at 5° C. for 24 hr to achieve reaction. Chloroform was evaporated off from the resultant reaction mixture, and benzene was added thereto to obtain a benzene solution of a reaction product. Methanol was added to the benzene solution, and cooled on ice to obtain white precipitate of the reaction product. This white precipitate was dissolved in ethyl acetate, and undissolved precipitate residue was removed from the ethyl acetate solution by suction filtering. The ethyl acetate was evaporated off by an evaporator from the filtrate, and the thus obtained solid was dried in vacuo. Thus, chain polymeric compound B comprising PSt as a principal chain was obtained.

Production and Evaluation of Writing Pad 5 g of the above chain polymeric compound B was gradually added to 995 g of tetrahydrofuran at room temperature under stirring, thereby obtaining a dispersion of the chain polymeric compound B.

The PET film with electrode $F_0$ obtained in Example 1 was immersed in this dispersion, and the PET film was lifted from the dispersion at a rate of 1 mm/sec, followed by heating at 120° C. for 30 min to dry the same. Thus, a PET film with electrode $F_2$ having the electrode surface treated with the chain polymeric compound B was obtained.

The coefficient of friction and the resistance to scuffing of the electrode surface of the PET film with electrode $F_2$ were evaluated in the same manner as in Example 12.

The results are also shown in Table 2.

A writing pad was produced in the same manner as in Example 1, except that the above PET film with electrode $F_2$ and the glass plate with electrode. $G_3$ obtained in Example 3 were employed. With respect to the obtained writing pad, the required input load, the erroneous input load and the durability were evaluated in the same manner as in Example 1.

The results are also shown in Table 3.

EXAMPLE 14

Synthesis of Chain Polymeric Compound C

The inside of a three-necked flask was deaerated, and nitrogen gas was introduced thereinto to create a nitrogen gas atmosphere inside the flask. Thereafter, 5 g of methyl methacrylate purified by vacuum distillation, 0.14 g of 3-mercaptopropionic acid, 0.07 g of 2,2'-azobisisobutyronitrile and 10 g of dried tetrahydrofuran as a solvent were placed in the three-necked flask. The mixture was reacted at 60° C. for 3 hr with stirring, and the solvent was evaporated off from the resultant reaction mixture to obtain a white powdery reaction product. This white powder was dissolved in benzene, and hexane was added to the benzene solution and cooled on ice to obtain white precipitate of a reaction product. This white precipitate was separated by suction filtering, and dried in vacuo to obtain 3.3 g of purified polymethyl methacrylate (PMMA) having carboxyl terminal groups. The number average molecular weight of the obtained PMMA was measured by GPC, which was found to be $8.5 \times 10^3$.

A mixture of 2 g of the thus obtained PMMA, 100 g of chloroform as a solvent and 0.049 g of dicyclohexylcarbodiimide as a catalyst was stirred in a round bottom flask while cooling in an ice bath for 2 hr. Thereafter, 0.13 g of aminopropyltriethoxysilane was added to the mixture, and allowed to stand still at 5° C. for 24 hr to achieve reaction. Chloroform was evaporated off from the resultant reaction mixture, and benzene was added thereto to obtain a benzene solution of a reaction product. Hexane was added to the benzene solution, and cooled on ice to obtain white precipitate of the reaction product. This white precipitate was dissolved in ethyl acetate, and undissolved precipitate residue was removed from the ethyl acetate solution by suction filtering. The ethyl acetate was evaporated off by an evaporator from the filtrate, and the thus obtained solid was dried in vacuo. Thus, chain polymeric compound C comprising PMMA as a principal chain was obtained.

Production and Evaluation of Writing Pad 20 g of the above chain polymeric compound C was gradually added to 980 g of tetrahydrofuran at room temperature under stirring, thereby obtaining a dispersion of the chain polymeric compound C.

The PET film with electrode $F_0$ obtained in Example 1 was immersed in this dispersion, and the PET film was lifted from the dispersion at a rate of 2 mm/sec, followed by heating at 120° C. for 30 min to dry the same. Thus, a PET film with electrode $F_3$ having the electrode surface treated with the chain polymeric compound C was obtained.

The coefficient of friction and the resistance to scuffing of the electrode surface of the PET film with electrode $F_3$ were evaluated in the same manner as in Example 12.

The results are also shown in Table 2.

A writing pad was produced in the same manner as in Example 1, except that the above PET film with electrode $F_3$ and the glass plate with electrode $G_8$ obtained in Example 8 were employed. With respect to the obtained writing pad, the required input load, the erroneous input load and the durability were evaluated in the same manner as in Example 1.

The results are also shown in Table 3.

EXAMPLE 15

Synthesis of Chain Polymeric Compound D

The inside of a three-necked flask was deaerated, and nitrogen gas was introduced thereinto to create a nitrogen gas atmosphere inside the flask. Thereafter, 15 g of vinyl acetate purified by vacuum distillation, 0.15 g of 4,4'-azobis(4-cyanoisovaleric acid) and 5 g of methanol as a solvent were placed in the three-necked flask. The mixture was reacted at 60° C. for 4 hr with stirring, and the solvent was evaporated off from the resultant reaction mixture. Thus, a white powdery reaction product was obtained. This white powder was dissolved in dioxane, and diethyl ether was added to the dioxane solution and cooled on ice to obtain white precipitate of a reaction product. This white precipitate was separated by suction filtering, and dried in vacuo to obtain 12.1 g of purified polyvinyl acetate (PVAc) having carboxyl terminal groups. The number average molecular weight of the obtained PVAc was measured by GPC, which was found to be $1.3 \times 10^5$.

A mixture of 6 g of the thus obtained PVAc and 100 g of chloroform as a solvent was stirred in a round bottom flask while cooling in an ice bath for 2 hr. Thereafter, 0.026 g of aminopropyltriethoxysilane was added to he mixture, and allowed to stand still at 5° C. for 24 hr to achieve reaction. Chloroform was evaporated off from the resultant reaction mixture, and dioxane was added thereto to thereby obtain a dioxane solution of a reaction product. Diethyl ether was added to the dioxane solution, and cooled on ice to thereby obtain white precipitate of the reaction product. This white precipitate was dissolved in ethyl acetate, and undissolved precipitate residue was removed from the ethyl acetate solution by suction filtering. The ethyl acetate was evaporated off by an evaporator from the filtrate, and the thus obtained solid was dried in vacuo. Thus, chain polymeric compound D comprising PVAc as a principal chain was obtained.

Production and Evaluation of Writing Pad 3 g of the above chain polymeric compound D was gradually added to 997 g of tetrahydrofuran at room temperature under stirring, thereby obtaining a dispersion of the chain polymeric compound D.

The PET film with electrode $F_0$ obtained in Example 1 was immersed in this dispersion, and the PET film was lifted from the dispersion at a rate of 2 mm/sec, followed by heating at 120° C. for 30 min to dry the same. Thus, the PET film with electrode $F_4$ having the electrode surface treated with the chain polymeric compound D was obtained.

The coefficient of friction and the resistance to scuffing of the electrode surface of the PET film with electrode $F_4$ were evaluated in the same manner as in Example 12.

The results are also shown in Table 2.

A writing pad was produced in the same manner as in Example 1, except that the above PET film with electrode $F_4$ and the glass plate with electrode $G_9$ obtained in Example 9 were employed. With respect to the obtained writing pad, the required input load, the erroneous input load and the durability were evaluated in the same manner as in Example 1.

The results are also shown in Table 3.

EXAMPLE 16

The same procedure as in Example 12 was repeated except that the glass plate with electrode $G_3$ obtained in Example 3 was employed in place of the PET film with electrode $F_0$, thereby obtaining a glass plate with electrode $G_{12}$ in which insulating dot spacers were formed on the electrode and in which the surface of the electrode was treated with the chain polymeric compound A.

The coefficient of friction and the resistance to scuffing of the electrode surface of the glass plate with electrode $G_{12}$ were evaluated in the same manner as in Example 12.

The results are also shown in Table 2.

A writing pad was produced in the same manner as in Example 1, except that the above glass plate with electrode $G_{12}$ and the PET film with electrode $F_0$ obtained in Example 1 were employed. With respect to the obtained writing pad, the required input load, the erroneous input load and the durability were evaluated in the same manner as in Example 1.

The results are also shown in Table 3.

EXAMPLE 17

In the same manner as in Example 8, insulating dot spacers were formed on the surface treated with chain polymeric compound B of the electrode of the PET film with electrode $F_2$ obtained in Example 13, thereby obtaining a PET film with electrode $F_5$.

The coefficient of friction and the resistance to scuffing of the electrode surface of the PET film with electrode $F_5$ were evaluated in the same manner as in Example 12.

The results are also shown in Table 2.

A writing pad was produced in the same manner as in Example 1, except that the above PET film with electrode $F_5$ and the glass plate with electrode $G_0$ obtained in Example 1 were employed. With respect to the obtained writing pad, the required input load, the erroneous input load and the durability were evaluated in the same manner as in Example 1.

The results are also shown in Table 3.

Comparative Example 3

The coefficient of friction and the resistance to scuffing of the electrode surface of the PET film with electrode $F_0$ obtained in Example 1 were evaluated in the same manner as in Example 12.

The results are also shown in Table 2.

TABLE 2

|  | Substrate with Electrode | Type of Chain Polymer | Load:20 g | | Load:40 g | | Load:60 g | | Load:80 g | |
|---|---|---|---|---|---|---|---|---|---|---|
|  |  |  | Coefficient of Friction | Resistance to Scuffing | Coefficient of Friction | Resistance to Scuffing | Coefficient of Friction | Resistance to Scuffing | Coefficient of Friction | Resistance to Scuffing |
| Example 12 | $F_1$ | POE Chain Polymer A | 0.20 | good | 0.25 | good | 0.30 | good | 0.29 | good |
| Example 13 | $F_2$ | PSt Chain Polymer B | 0.20 | good | 0.27 | good | 0.30 | good | 0.35 | good |
| Example 14 | $F_3$ | PMMA Chain Polymer C | 0.20 | good | 0.25 | good | 0.30 | good | 0.34 | good |
| Example 15 | $F_4$ | PVAc Chain Polymer D | 0.25 | good | 0.28 | good | 0.31 | good | 0.30 | good |
| Example 16 | $G_{12}$ | POE Chain Polymer A | 0.20 | good | 0.26 | good | 0.28 | good | 0.30 | good |
| Example 17 | $F_5$ | PSt chain Polymer B | 0.22 | good | 0.28 | good | 0.28 | good | 0.30 | good |
| Comparative Example 3 | $F_0$ | — | 0.50 | poor | 0.75 | poor | 0.87 | poor | 0.96 | poor |

TABLE 3

|  | Combination of Electrode-Bearing Substrate | | Required Input Load (g) | | Erroneous Input Load | Durability |
|---|---|---|---|---|---|---|
|  | Upper Substrate with Electrode | Lower Substrate with Electrode | R = 1 mmφ | R = 2 mmφ | R = 10 mmφ | (times) |
| Ex.12 | $F_1$ | $G_1$ | 60 | 170 | 2,000 | 600,000 or more |
| Ex.13 | $F_2$ | $G_3$ | 60 | 170 | 2,000 | 600,000 or more |
| Ex.14 | $F_3$ | $G_8$ | 50 | 140 | 1,500 | 600,000 or more |
| Ex.15 | $F_4$ | $G_9$ | 60 | 190 | 2,500 | 600,000 or more |
| Ex.16 | $F_0$ | $G_{12}$ | 60 | 180 | 2,400 | 600,000 or more |
| Ex.17 | $F_5$ | $G_0$ | 60 | 180 | 2,400 | 600,000 or more |

We claim:

1. A writing pad comprising a pair of substrates each having an electrode formed on one of the surfaces, the pair of substrates being disposed in parallel in such a way that the electrodes face one another with a predetermined gap between the substrates by means of a plurality of insulating dot spacers, wherein a height (G) of the dot spacers is not greater than 15 μm, a diameter (d) of the dot spacers on the electrode surface to which the dot spacers are fixed is d>G, and an average center distance (L) between the adjacent dot spacers is not greater than 100 μm and 3 d<L<100 d, and further wherein, when the tip of an input pen for depressing either of the substrate has a radius of curvature (R μm), the average center distances (L) of the dot spacers satisfy the following relationship:

$$L \leq R/n$$

wherein n is a positive integer of 4 or greater.

2. The writing pad as claimed in claim 1, wherein the insulating dot spacers are composed of a mixture of two types of insulating dot spacers having different individual heights $G_1$ and $G_2$ ($G_1 > G_2$).

3. A writing pad comprising a pair of substrates each having an electrode formed on one of the surfaces, the pair of substrates being disposed in parallel in such a way that the electrodes face one another with a predetermined gap between the substrates by means of a plurality of insulating dot spacers, wherein a height (G) of the dot spacers is not greater than 15 μm, a diameter (d) of the dot spacers on the electrode surface to which the dot spacers are fixed is d>G, and an average center distance (L) between the adjacent dot spacers is not greater than 100 μm and 3 d<L<100 d and further, wherein at least one of the pair of electrode surfaces is treated with an insulating chain organic polymeric compound having a functional group capable of binding with a material composing the electrode.

4. The writing pad as claimed in claim 3, wherein the functional group capable of bonding with the electrode material is represented by the following formula:

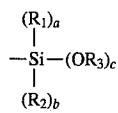

wherein each of $R_1$, $R_2$ and $R_3$ independently is a hydrogen atom or an alkyl group having 1 to 4 carbon atoms; and each of a and b is an integer of 0 to 2 and c is an integer of 1 to 3, provided that $a+b+c=3$, and the organic polymeric compound has a number average molecular weight of 1000 to 200,000.

5. A process for producing a writing pad comprising a pair of substrates each having an electrode formed on one of the surfaces, the pair of substrates being disposed in parallel in such a way that the electrodes face one another with a predetermined gap between the substrates imposed by a plurality of insulating dot spacers, which comprises a step of forming droplets of a spacer forming solution comprising an organic solvent and, dissolved or dispersed therein, a nonconductive resin on a preheated electrode surface, and evaporating the organic solvent from the droplets to form insulating dot spacers on the electrode surface, wherein a height (G) of the dot spacers is not greater than 15 µm, a diameter (d) of the dot spacers on the electrode surface is greater than G (d>G), and an average center distance (L) between the adjacent dot spacers is not greater than 100 µm and 3 d<L<100 d.

6. The process for producing a writing pad as claimed in claim 5, which further comprises applying a coating solution comprising an organic solvent and, dissolved or dispersed therein, an insulating chain organic polymeric compound having a functional group capable of bonding with a material composing the electrode to at least one of the pair of electrode surfaces and drying the electrode surface applied the coating solution, effecting treatment of the electrode surface with the insulating chain organic polymeric compound.

7. The process for producing a writing pad as claimed in claim 5, which further comprises a step of applying a first coating solution comprising a compound having both organic and inorganic reactive groups in the same molecule to at least one of the pair of electrode surfaces, subsequently applying a second coating solution comprising a chain organic polymeric compound having a functional group reactive with the organic reactive group to the first coating solution-bearing electrode surface and drying the electrode surface applied the first coating solution, effecting treatment of the electrode surface with the insulating chain organic polymeric compound.

8. The writing pad as claimed in claim 2, wherein, when the tip of an input pen for depressing either of the substrate has a radius of curvature (R µm), the average center distances (L) of the dot spacers satisfy the following relationship:

$$L \leq R/n$$

wherein n is a positive integer of 4 or greater.

* * * * *